(12) United States Patent
Isomura et al.

(10) Patent No.: US 11,843,262 B2
(45) Date of Patent: Dec. 12, 2023

(54) OPTICAL POWER SUPPLY CONVERTER

(71) Applicant: Kyoto Semiconductor Co., Ltd., Kyoto (JP)

(72) Inventors: Takatomo Isomura, Kyoto (JP); Etsuji Omura, Kyoto (JP)

(73) Assignee: Kyoto Semiconductor Co., Ltd., Kyoto (JP)

(*) Notice: Subject to any disclaimer, the term of this patent is extended or adjusted under 35 U.S.C. 154(b) by 193 days.

(21) Appl. No.: 17/435,074

(22) PCT Filed: Feb. 22, 2021

(86) PCT No.: PCT/JP2021/006557
§ 371 (c)(1),
(2) Date: Aug. 31, 2021

(87) PCT Pub. No.: WO2022/176185
PCT Pub. Date: Aug. 25, 2022

(65) Prior Publication Data
US 2023/0179027 A1   Jun. 8, 2023

(51) Int. Cl.
*H02J 50/30*   (2016.01)
*H04B 10/80*   (2013.01)

(52) U.S. Cl.
CPC ............ *H02J 50/30* (2016.02); *H04B 10/807* (2013.01)

(58) Field of Classification Search
None
See application file for complete search history.

(56) References Cited

U.S. PATENT DOCUMENTS

2011/0108081 A1   5/2011   Werthen et al.

FOREIGN PATENT DOCUMENTS

| JP | H0488308 A | * | 3/1992 |
| JP | H9113768 A | * | 5/1997 |
| JP | 2018087840 A | * | 6/2018 |
| WO | 2019/150533 A1 | | 8/2019 |

* cited by examiner

*Primary Examiner* — David W Lambert
(74) *Attorney, Agent, or Firm* — Norris McLaughlin, P.A.

(57) ABSTRACT

An optical power supply converter (1) that photoelectrically converts light from optical fiber cables comprises a reflecting unit (3) including a concave reflecting mirror (6) made of a rotating paraboloid, a light receiving element (2) including a light receiving surface (2a) at the focus of the mirror (6) orthogonal to the rotation axis of the mirror (6), and a plurality of mounting portions (9) for mounting the emitting ends (OE) of the fiber cables. The seperation distance (s), the shift distance (h) and the divergence angle (θ) are set appropriately so as to concentrate all reflected light on the light receiving surface (2a).

4 Claims, 6 Drawing Sheets

OPTICAL POWER SUPPLY CONVERTER

TECHNICAL FIELD

The present invention relates to an optical power supply converter that converts light input via an optical fiber cable into an electric current by photoelectric conversion and outputs the electric power.

BACKGROUND ART

It may not be possible to supply power to operate electronic devices via a power cable in special environments such as remote areas without power supply equipment, environments where weak electromagnetic fields generated by power supply become noise, environments that require explosion protection, and ultra-high voltage equipment that has electrical mutual influence. Therefore, an optical power supply converter that sends light to the side of electronic devices via an optical fiber cable and converts the light into an electric current is used.

Such an optical power supply converter is required to be able to output even larger power. For example, as in Patent Document #1, an optical power supply converter in which light receiving units divided in an array are connected in series in order to increase the output voltage of the optical power supply converter is known. However, this is not such an optical power supply converter that increases the output electric power. Moreover, it is not easy to make it possible to output by improving the photoelectric conversion efficiency.

On the other hand, increasing the optical input to the optical power converter is effective in increasing the output. However, in a general single-mode optical fiber cable, the diameter of the core through which light propagates is as small as about 10 μm. Therefore, for example, the core may be damaged by the fiber fuse phenomenon for a large optical input exceeding 1 W, and therefore, it is considered to input light from a plurality of optical fiber cables. By providing a partially spherical concave reflector as in Patent Document #2, for example, light from a plurality of optical fiber cables can be input, and the incident light is reflected and collected by the concave reflector, so as to be incident on the light absorption region.

PRIOR ART DOCUMENTS

Patent Documents

Patent Document #1: US Pat.Application Publication 2011/0108081.
Patent Document #2: WO Publication 2019/150533.

SUMMARY OF THE INVENTION

Problems to be Solved by the Invention

In the semiconductor light receiving element of Patent Document #2, the semiconductor light receiving element is positioned closer to the concave reflector side than the focal position of the concave reflector so that parallel light rays incident parallel to the center line of the light absorption region do not focus in the light absorption region. Further, it is difficult for light that is not parallel to the center line of the light absorption region to enter the light absorption region. And this concave reflector cannot be large enough to input from a plurality of optical fiber cables disposed side by side. Therefore, when forming an optical power supply converter, it is necessary to equip a plurality of semiconductor light receiving elements so as to correspond to a plurality of optical fibers, or to make the optical inputs of a plurality of optical fiber cables parallel rays and superimpose them on a concave reflector, thereby it is necessary to equip a complicated optical system for incident. Therefore, there is a problem that the optical power supply converter becomes large and the manufacturing cost also increases.

An object of the present invention is to provide an optical power supply converter capable of easily increasing the number of optical fiber cables for inputting light and increasing the output by making the entire optical input incident into a light receiving element.

Means to Solve the Problems

The present invention presents an optical power supply converter that photoelectrically converts light incident through a plurality of optical fiber cables and supplies a power to outside, comprising; a reflecting part including a concave reflecting mirror whose reflective surface is a concave surface made of a rotating paraboloid, a light receiving element for photoelectric conversion having a light receiving surface orthogonal to a rotation axis of the concave reflecting mirror and arranged so that a center of the light receiving surface coincides with a focal point of the concave reflecting mirror, and a plurality of mounting portions for mounting emitting ends of the optical fiber cables in parallel with the rotation axis with separating the emitting ends of the optical fiber cables by one or more predetermined separation distances from the rotation axis so as to emit light toward the concave reflecting mirror, the plurality of mounting portions being capable of mounting the emitting ends at positions closer to or away from the concave reflecting mirror by one or more shift distances corresponding to the separation distance in an axial direction of the rotation axis from a plane including the light receiving surface.

According to above configuration, the optical power supply converter reflects the light incident through the optical fiber cables mounted on the plurality of mounting portions by the concave reflecting mirror, and makes the light incident on the light receiving surface of the light receiving element. The concave reflecting mirror uses the concave surface of the rotating paraboloid as the reflecting surface. The light receiving element is arranged so that the light receiving surface is orthogonal to the rotation axis of the concave reflecting mirror and the center of the light receiving surface coincides with the focal point of the concave reflecting mirror. The optical axis of the light emitted from the emitting end of the optical fiber cable mounted parallel to the rotation axis of the concave reflecting mirror is parallel to the rotation axis. The light on the optical axis is reflected by the concave reflecting mirror based on the nature of the rotating paraboloid, reaches the focal point of the concave reflecting mirror. Since the light emitted from the emitting end of the optical fiber cable spreads with a divergence angle, the light spreading around the optical axis is reflected by the concave reflecting mirror and reaches the vicinity of the focal point. The emitting ends of the optical fiber cables are separated from the rotation axis of the concave reflecting mirror by a predetermined separation distance, and are shifted in the axial direction of the rotation axis by a shift distance corresponding to the separation distance from the plane including the light receiving surface of the light receiving element. As a result, the emitting ends can be mounted so as to keep the reachable range within the light receiving surface according to the separation distance. Therefore, the output of the optical power supply converter can be increased by making all the light incident through the optical fiber cables incident into the light receiving element.

In a preferable first aspect of the invention, the shift distance is set based on a divergence angle of the light emitted from the emitting end of the optical fiber cable and the separation distance so that all the light emitted from the emitting ends are incident on the light receiving surface.

According to the above configuration, the position of the emitting ends can be set according to the optical fiber cables to be mounted. Therefore, all of the emitted light can be incident on the light receiving surface to increase the output of the optical power supply converter.

In a preferable second aspect of the invention, the plurality of mounting portions are formed so that the emitting ends of the plurality of optical fiber cables can be mounted in an arc shape centered on the rotation axis.

According to the above configuration, since the separation distances of the emitting ends of a plurality of optical fiber cables can be made uniform, the shift distances can be made uniform according to the separation distances. Therefore, it becomes easy to mount the plurality of emitting ends on the corresponding mounting portions. Then, all of the light emitted from the emitting ends can be incident on the light receiving surface to increase the output of the optical power supply converter.

In a preferable third aspect of the invention, the mounting portions are formed so that the emitting ends of a ribbon fiber cable formed by arranging a plurality of the optical fiber cables in parallel in a row can be mounted.

According to the above configuration, by aligning the separation distances of the emitting ends of a plurality of optical fiber cables, the shift distances can be aligned and the optical fiber cables can be mounted integrally. Therefore, it becomes easy to mount these emitting ends on the mounting portions. Then, all of the light emitted from the emitting ends can be incident on the light receiving surface to increase the output of the optical power supply converter. Further, since the number of optical fiber cables that can be mounted can be increased by minimizing the distance between the optical fiber cables, the output of the optical power supply converter can be increased.

Advantages of the Invention

According to the optical power supply converter of the present invention, the number of optical fiber cables for inputting light can be easily increased, and the entire optical input can be incident on the light receiving element to increase the output.

DESCRIPTION OF EMBODIMENTS

Best mode for implementing the present invention will now be explained on the basis of embodiments.

First Embodiment

Figure 1:
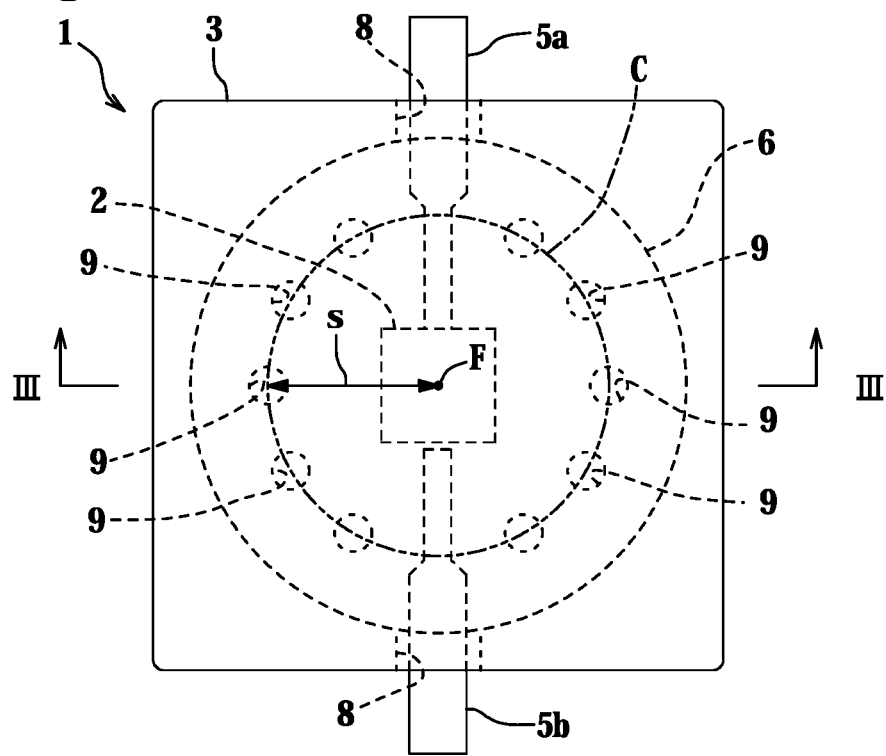
FIG. 1 is a plan view of an optical power supply converter according to a first embodiment of the present invention.
Figure 2:
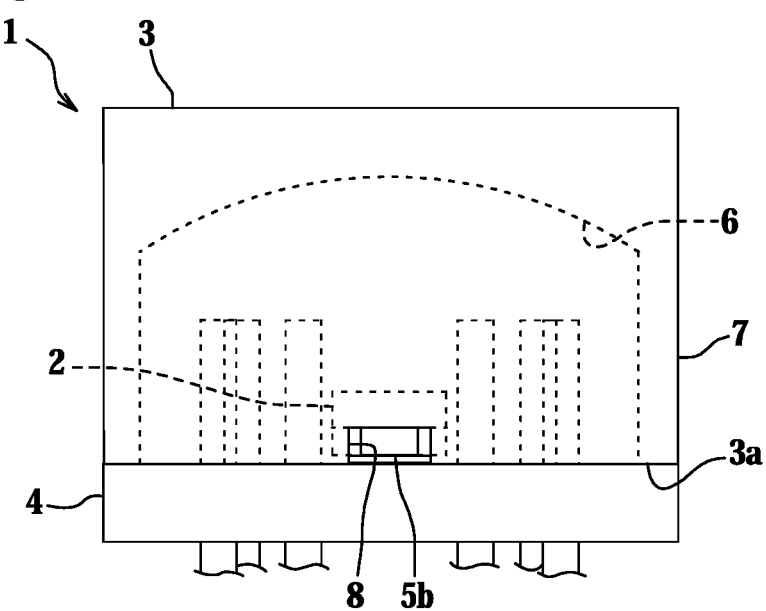
FIG. 2 is a side view of the optical power supply converter of FIG. 1.
Figure 3:
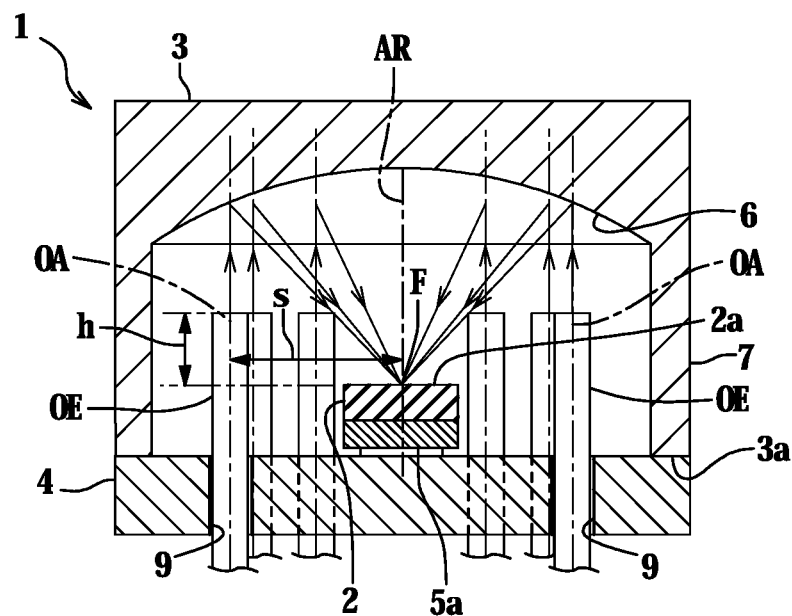
FIG. 3 is a sectional view taken along line of FIG. 1.

The optical power supply converter 1 converts an optical input (incident light) incident through optical fiber cables into a current by photoelectric conversion and supplies power to the outside. As shown in FIGS. 1 to 3, the optical power supply converter 1 comprises a light receiving element 2 for photoelectric conversion, a reflecting unit 3 for reflecting incident light toward the light receiving element 2, and a base 4 supporting the reflecting unit 3. and a pair of lead frames 5a and 5b for supplying power to the outside.

The light receiving element 2 has a photodiode (not shown), and is a semiconductor light receiving element that converts light having a wavelength in the infrared light region, visible light region, or ultraviolet light region incident on the light receiving surface 2a of the photodiode into a current. The light receiving element 2 is fixed to one of a pair of lead frames 5a and 5b (here, the lead frame 5a). Then, in order to output the current due to photoelectric conversion to the outside, the light receiving element 2 is electrically connected to the pair of lead frames 5a and 5b by, for example, a metal wire (not shown).

Figure 4:
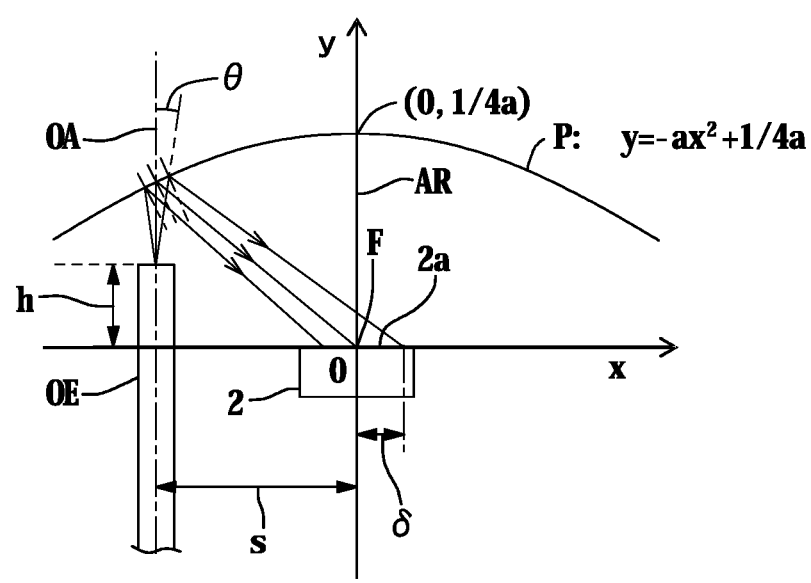
FIG. 4 is an explanatory diagram of an incident position of light emitted from an emitting end of an optical fiber cable.

The reflecting unit 3 includes a concave reflecting mirror 6 having a concave surface of a rotating paraboloid formed by rotating the parabola P on the xy plane shown in FIG. 4 around the y-axis as the rotation axis AR. This parabola P is represented as $y=-ax^2+(1/4)a$, and the focal point F coincides with the origin O.

As shown in FIGS. 2 and 3, the concave reflecting mirror 6 is formed by, for example, a concave surface that is formed on a reflective portion 3 made of synthetic resin by recessing from the surface 3a side so as to have a concave surface of a rotating paraboloid surface. The concave surface is formed so as to reflect incident light by forming, for example, a metal film (not shown) such as Ag,Au or Al. The concave reflecting mirror 6 has, for example, a diameter of 3.5 mm and a focal length of 1.5 mm. Here, it corresponds to $a=1/6$ mm in FIG. 4. The diameter and focal length of the concave reflecting mirror 6 can be set otherwise as appropriate.

As shown in FIGS. 1 to 3, the reflecting portion 3 is formed with a side wall portion 7 having a cylindrical inner wall connected to the outer edge of the concave reflecting mirror 6. The focal point F on the rotation axis AR of the concave reflecting mirror 6 is located within the reflecting portion 3 by the side wall portion 7. The reflective portion

3 is fixed in a state where the surface 3a is in contact with the base 4 by, for example, an adhesive. Although the side wall portion 7 is integrally formed with the reflecting portion 3 on which the concave reflecting mirror 6 is formed, the side wall portion 7 may be formed separately and joined. The side wall portion 7 of the reflection portion 3 is provided with a pair of cutout portions 8 so as to face each other on a straight line orthogonal to the rotation axis AR.

The pair of lead frames 5a and 5b are respectively inserted into the corresponding cutout portions 8 of the reflecting portion 3 and fixed to the reflecting portion 3. Here, the light receiving element 2 fixed to either one of the pair of lead frames 5a and 5b has the light receiving surface 2a so that the light receiving surface 2a is orthogonal to the rotation axis AR of the concave reflecting mirror 6. It is arranged so that the focal point F and the center of the light receiving surface 2a coincide with each other.

The light receiving element 2 may be fixed to the base 4, and may be configured so that it can output electric power to the outside via the wiring formed on the base 4 corresponding to the lead frames 5a and 5b.

The base 4 has a plurality of mounting portions 9 capable of mounting the emitting ends OE of the optical fiber cables that emit light toward the concave reflecting mirror 6 in parallel with the rotation axis AR of the concave reflecting mirror 6. These mounting portions 9 are disposed appropriately spaced in an arc along a circle C connecting points separated by a predetermined separation distance s from the rotation axis AR of the concave reflecting mirror 6 so as not to interfere with the lead frames 5a and 5b.

The mounting portion 9 is a through hole penetrating the base 4, and has, for example, a cylindrical inner wall formed in parallel with the rotation axis AR of the concave reflecting mirror 6. The emitting end OE inserted into the mounting portion 9 is fixed by, for example, an adhesive or a fixture. Here, the emitting end OE is mounted so that the emitting end surface is shifted in the axial direction of the rotation axis AR by a shift distance h corresponding to the separation distance s from the plane including the light receiving surface 2a of the light receiving element 2. The outer diameter of the emitting end OE is, for example, 0.25 mm, and the inner diameter of the mounting portion 9 is such that the emitting end OE can be inserted. When the emitting end OE is attached to the mounting portion 9, the optical axis OA of the light emitted from the emitting end OE is separated from the rotation axis AR by a predetermined separation distance s.

The optical power supply converter 1 reflects the light incident through the optical fiber cables mounted to the mounting portion 9 by the concave reflecting mirtror 6 and makes the reflected light incident on the light receiving surface 2a of the light receiving element 2. The optical axis OA of the light emitted from the emitting end OE of the optical fiber cable mounted parallel to the rotation axis AR of the concave reflecting mirror 6 is parallel to the rotation axis AR. The light on the optical axis OA is reflected by the concave reflecting mirror 6 based on the nature of the rotating paraboloid and reaches the focal point F of the concave reflecting mirror 6.

As shown in FIG. 4, since the light emitted from the emitting end OE of the optical fiber cable has a divergence angle $\theta$ (half angle) and spreads, the light spreading around the optical axis OA is reflected by the reflecting mirror 6 expressed with the parabola P and reaches the vicinity of the focal point F. The distance between the arrival position on the plane including the light receiving surface 2a of the light beam spreading at the divergence angle $\theta$ and the focal point F is defined as the spreading distance $\delta$. The plane including the light receiving surface 2a is a plane including the x-axis in FIG. 4 and is orthogonal to the y-axis.

Figure 5:
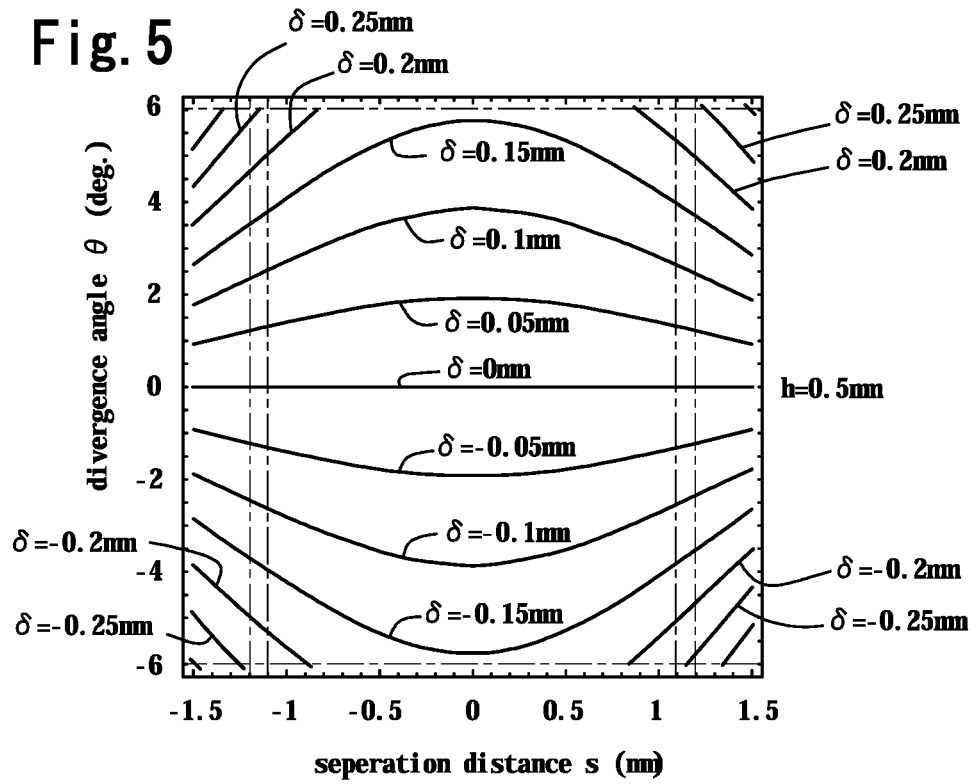
FIG. 5 is a diagram showing the relationship between the separation distance, the divergence angle, and the spread distance.

FIG. 5 is a contour plot of the spread distance $\delta$ with the separation distance s and the divergence angle $\theta$ as parameters when the shift distance h=0.5 mm. The separation distance s and the spread distance $\delta$ are positive values when they are separated from the y-axis in the positive direction of the x-axis in FIG. 4. Further, the divergence angle $\theta$ has a positive value when it spreads in the positive direction of the x-axis with respect to the optical axis OA. The shift distance h has a positive value when it is shifted from the origin in the positive direction of the y-axis.

According to FIG. 5, if the divergence angle $\theta$ is constant, the larger the absolute value of the separation distance s, the larger the absolute value of the spread distance 6. In other words, when the divergence angle $\theta$ is constant, the farther the emitting end OE is from the rotation axis AR, the farther the arrival position is from the focal point F, and the wider the irradiation range is. Further, if the separation distance s is constant, the larger the absolute value of the divergence angle $\theta$, the larger the absolute value of the spread distance $\delta$. In other words, when the separation distance s is constant, the larger the divergence angle of the incident light, the farther the arrival position is from the focal point F, and the wider the irradiation range. Therefore, based on the separation distance $\delta$ and the divergence angle $\theta$, the shift distance h in which the spread distance 6 does not protrude from the light receiving surface 2a is set.

Figure 6:
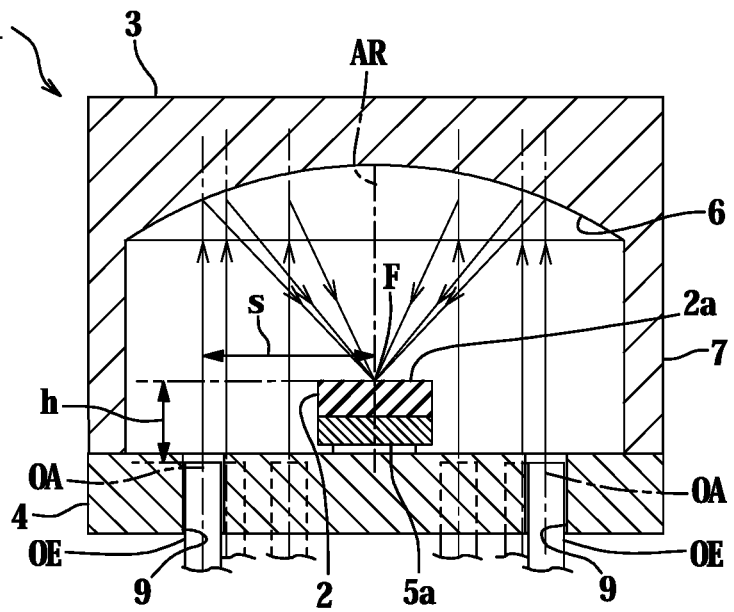
FIG. 6 is a sectional view corresponding to FIG. 3 in the case of different shift distances.

The emitting end OE is positioned so that the emitting end surface is closer to the concave reflecting mirror 6 (see FIG. 3) from the plane including the light receiving surface 2a of the light receiving element 2 by the shift distance h, or from the concave reflecting mirror 6 (see FIG. 6). The light on the optical axis OA is incident on the center of the light receiving surface 2a at the position of the focal point F regardless of the shift distance h.

Figure 7:
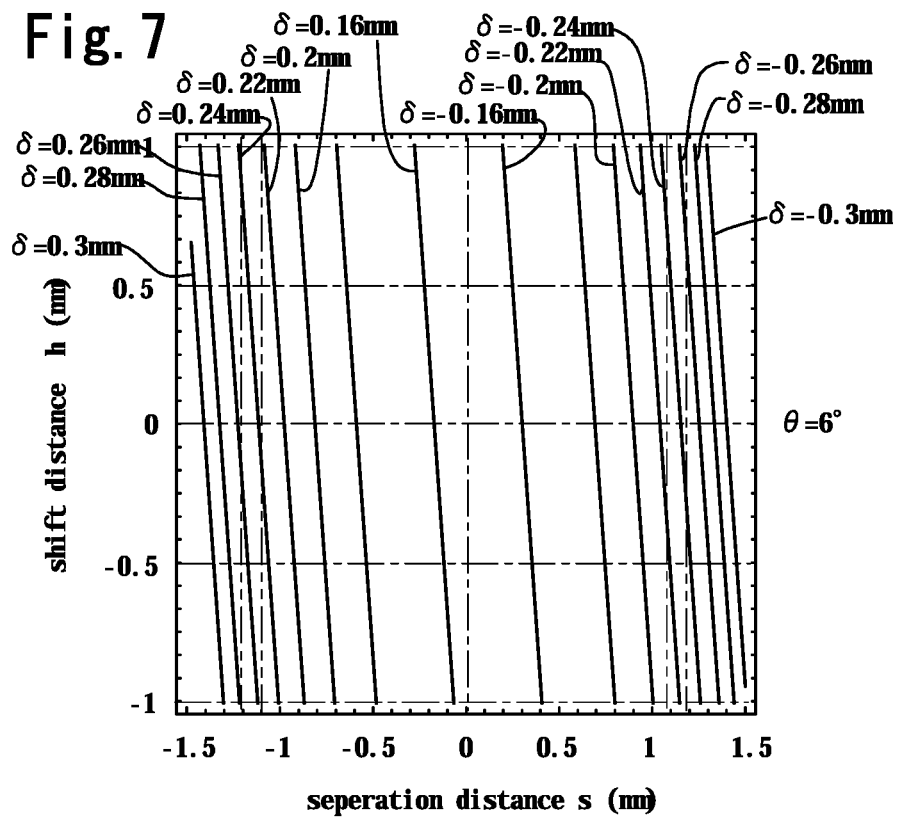
FIG. 7 is a diagram showing the relationship between the separation distance, the shift distance, and the spread distance.

FIG. 7 is a contour plot of the spread distance $\delta$ with the separation distance s and the shift distance h as parameters when the divergence angle $\theta=6°$ (the divergence angle is a positive value). The positive and negative of the separation distance s, the shift distance h, the spread distance $\delta$, and the divergence angle $\theta$ are the same as described above. According to FIG. 7, if the shift distance h is constant, the spread distance $\delta$ tends to increase as the separation distance s becomes a negative value and its absolute value increases (the more the emitting end OE moves away from the rotation axis AR).

When this divergence angle B is a positive value, if the separation distance s is a negative value and constant, the smaller the shift distance h (the farther the emitting end OE is from the concave reflector 6), the larger the spread distance $\delta$ become. On the other hand, if the separation distance s is a positive value and constant, the smaller the shift distance h, the smaller the absolute value of the spread distance $\delta$.

As the arrival position is farther from the focal point F, among the light incident via the optical fiber cable, the light that protrudes outward from the light receiving surface 2a of the light receiving element 2 and does not contribute to the output increases. Therefore, the separation distance s and the shift distance h according to the separation distance s are set so that all the incident light is incident on the light receiving surface 2a.

For example, since the light receiving element 2 having a radius of the light receiving surface 2a of 0.3 mm is generally a rectangular light receiving element 2 having a side length larger than 0.6 mm, the diameter of the emitting end OE (for example, 0.25 mm) can be set with considering the separation distance s that does not interfere with the light receiving element 2. At this time, based on the divergence angle θ of the emitted light, the separation distance s at which all the emitted light can be incident on the light receiving surface 2a is set. For example, when the divergence angle θ=6°, the separation distance s at which the absolute value of the spread distance |δ|<0.3 mm is set to, for example, s=+/− 1.2 mm, based on FIG. 7.

Then, the shift distance h at which all the incident light can be incident on the light receiving surface 2a is set. According to FIG. 7, when the separation distance s=−1.2 mm, 60.24 mm when h=1 mm and δ≈0.28 mm when h=−1 mm. When the separation distance s=1.2 mm, δ≈0.27 mm when h=1 mm and δ≈0.23 mm when h=−1 mm. Therefore, by setting the shift distance h in this range (−1 mm≤h≤1 mm), all of the incident light can be incident on the light receiving element 2 having the light receiving surface 2a having a radius of 0.3 mm.

In the case where the concave reflecting mirror 6 has a focal length of 1.5 mm and the separation distance s=+/−1.2 mm, the maximum value of the shift distance h at which the emitting end OE does not abut on the concave reflecting mirror 6 is about 1.1 mm. The minimum value of the shift distance his determined by the thickness of the base 4 or the range in which the emitting end OE can be attached by a fixture (not shown) or the like. Further, the divergence angle θ of the light emitted from a general single mode optical fiber cable is often about 6°, and if the separation distance s and the shift distance h are set assuming this divergence angle θ, there are many cases where the incident light can be prevented from protruding from the light receiving surface 2a.

Figure 8:
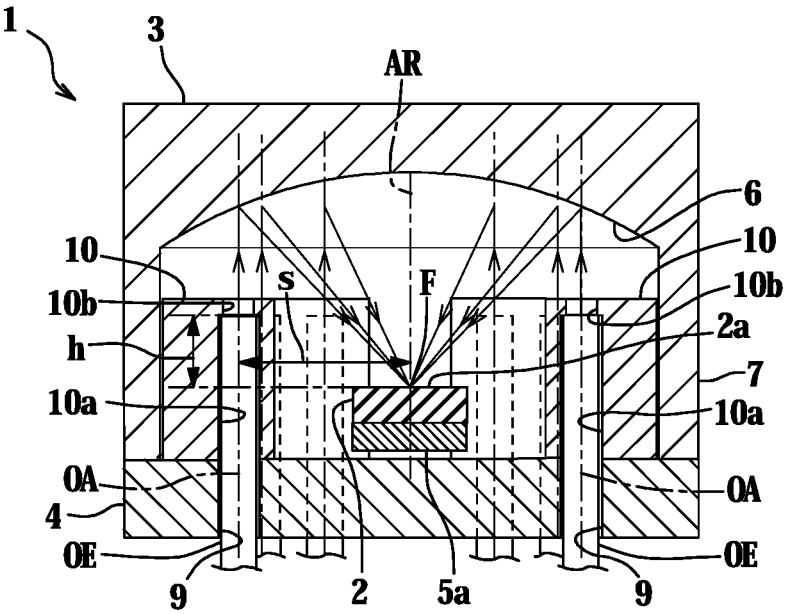
FIG. 8 is a sectional view corresponding to FIG. 3 when a guide portion is provided.

The mounting portion 9 may be equipped with, for example, a guide portion 10 as shown in FIG. 8 so that the emitting end OE can be inserted to a position corresponding to the shift distance h. The guide portion 10 has an insertion portion 10a through which the emitting end OE of the optical fiber cable can be inserted, and a restraining portion 10b for abutting and stopping the outer edge portion of the emitting end surface of the emitting end OE at a position of a shift distance h. The restraining portion 10b is formed by a through hole formed concentrically with the insertion portion 10a so as not to obstruct the incident light. With such a guide portion 10, it becomes easy to fix the emitting end OE at the shift distance h set according to the separation distance s. Although not shown, when the emitting end is attached by a fixture, for example, the optical fiber cable is fixed to the fixture with the emitting end OE protruding from the fixture by a length corresponding to the shift distance h. Then, the emitting end OE is inserted into the corresponding mounting portion 9 to fix the fixture to the base 4.

Second Embodiment

The optical power supply converter 1A in which the optical power supply converter 1 of the first embodiment is partially modified will be described. The same parts as those in the first embodiment are designated by the same reference numerals as those in the first embodiment, and the description thereof will be omitted.

Figure 9:
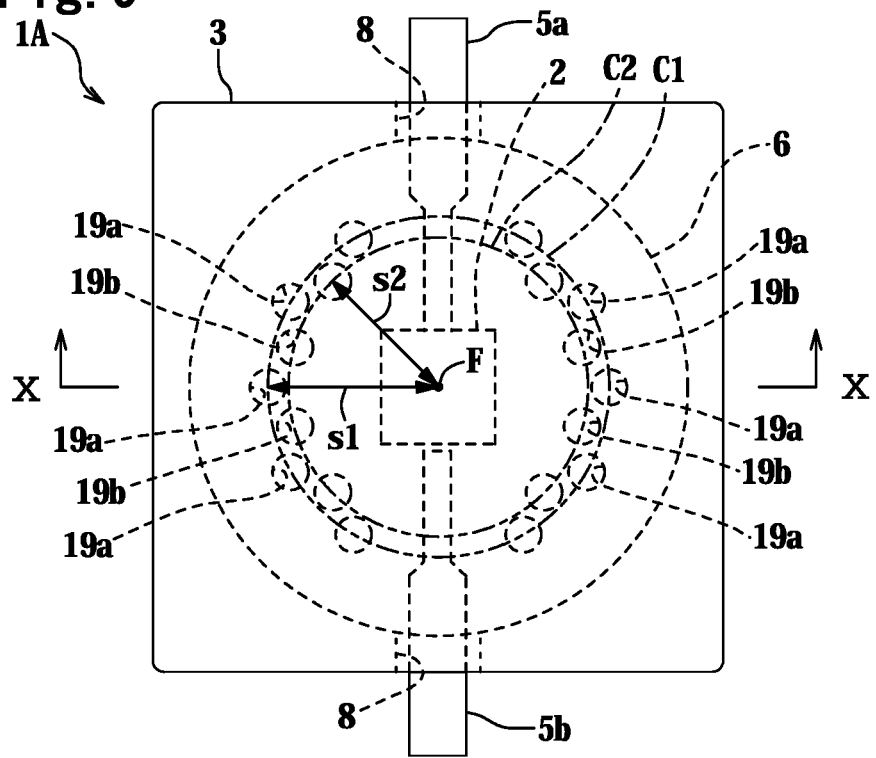
FIG. 9 is a plan view of an optical power supply converter when a plurality of separation distances are set.
Figure 10:
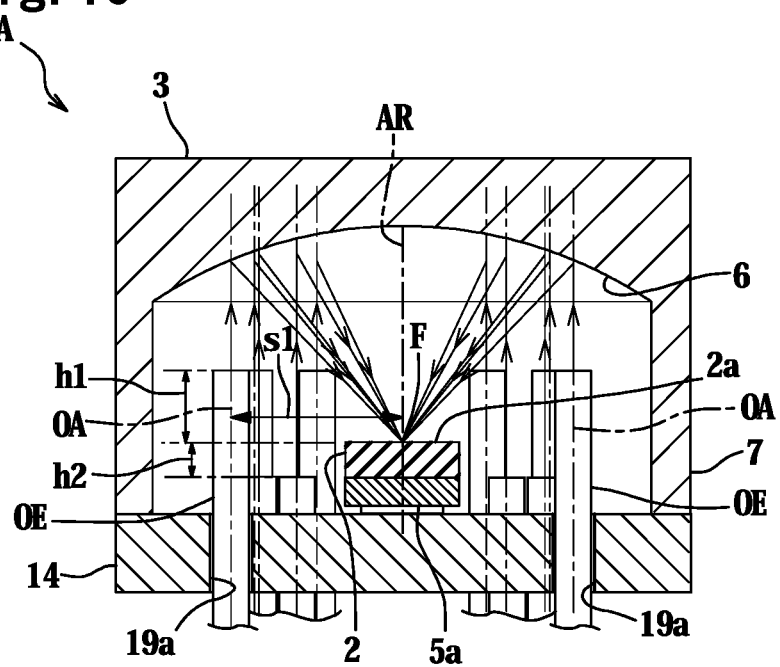
FIG. 10 is a sectional view taken along line X-X of FIG. 9.

As shown in FIGS. 9 and 10, the optical power supply converter 1A includes a light receiving element 2, a reflecting portion 3 for reflecting incident light toward the light receiving element 2, and a base 14 for supporting the reflecting portion 3. In order to increase the number of optical fiber cables that can be attached to the optical power supply converter 1A, two types of separation distances are set, but three or more types of separation distances can also be set.

The optical power supply converter 1A has a plurality of mounting portions 19a formed on the base 14 so as to be arranged in an arc shape along a circle C1 having a radius of separation distance s1=1.2 mm so as not to interfere with the lead frames 5a and 5b. Optical power supply converter 1A has a plurality of mounting portions 19b formed on the base 14 so as to be arranged in an arc shape along a circle C2 having a radius of separation distance s2=1.1 mm. The emitting end OE of the corresponding optical fiber cables are mounted on the plurality of mounting portions 19a and 19b. Similar to the first embodiment, the emitting ends OE are inserted in the mounting portions 19a and 19b so as to have shift distances h1 and h2 corresponding to the separation distances s1 and s2, and are fixed by an adhesive or a fixture. Further, a guide unit may be provided so as to make the shift distances h1 and h2 correspond to the separation distances s1 and s2.

The mounting portion 19a sets the shift distance h1 to, for example, 0.5 mm, and the mounting portion 19b sets the shift distance h to, for example, −0.3 mm. In this case, the spread distance δ=0.24 mm can be aligned in the light having a divergence angle θ=6° emitted from the emitting ends OE mounted on the plurality of mounting portions 19a and 19b, respectively. Therefore, all of the incident light can be incident on the light receiving element 2 having a light receiving surface 2a having a radius of 0.3 mm. At this time, the smaller the separation distance (closer to the rotation axis AR), the smaller the shift distance (h1>h2), and the emitting end closer to the rotation axis AR are arranged so as not to block the incident of light from the emitting end farther from the rotation axis AR. In particular, by setting the shift distance h2 to a negative value, it is possible to ensure that the incident does not interfere with each other.

Third Embodiment

The optical power supply converter 1B in which the optical power supply converter 1 of the first embodiment is partially modified will be described. The same parts as those in the first embodiment are designated by the same reference numerals as those in the first embodiment, and the description thereof will be omitted.

Figure 11:
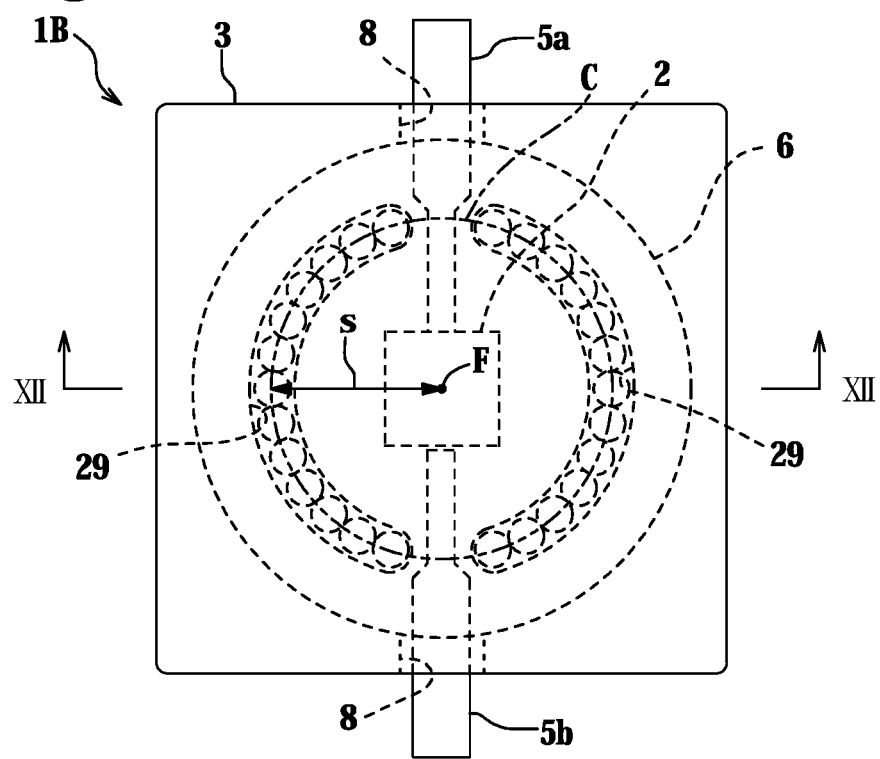
FIG. 11 is a plan view of an optical power supply converter according to a second embodiment of the present invention.
Figure 12:
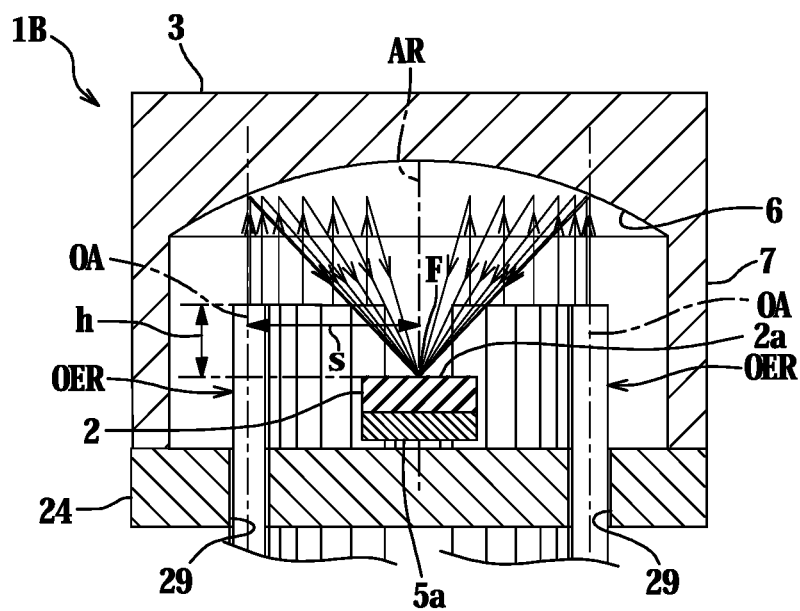
FIG. 12 is a sectional view taken along line XII-XII of FIG. 11

As shown in FIGS. 11 and 12, the optical power supply converter 1B includes a light receiving element 2, a reflecting portion 3 for reflecting incident light toward the light receiving element 2, and a base 24 for supporting the reflecting portion 3. The base 24 has a mounting portion 29 formed in an arc shape so as not to interfere with the lead frames 5a and 5b.

The mounting portion 29 is a through hole penetrating the base 24, and is formed in an arc shape along a circle C having a predetermined separation distance s as a radius. When the emitting ends OER of the ribbon fiber cable in which a plurality of optical fiber cables are arranged in parallel in a row and connected is mounted on the mounting portion 29, the core of each optical fiber cable is placed on a circle C having a separation distance s as a radius.

Since it is a ribbon fiber cable, the shift distance h can be easily aligned by aligning the emitting end faces. Further, since the distance between the adjacent optical fiber cables is the minimum, it is possible to attach more optical fiber cables than the optical power supply converter 1 to increase the optical input. Similar to the first embodiment, the ribbon fiber cable is inserted through the mounting portion 29 so as to have a shift distance h corresponding to the separation distance s, and is fixed by an adhesive or a fixture. Further, a guide portion may be provided so as to make the shift distance h correspond to the separation distance s. It is also possible to correspond to two or more kinds of separation distances as in the second embodiment.

The actions and effects of the above optical power supply converters 1, 1A and 1B will be described.

The optical power supply converters 1, 1A and 1B have a concave reflecting mirror 6 having a concave surface of a rotating paraboloid as a reflecting surface. The concave reflecting mirror 6 reflects light emitted from the emitting end OE of the optical fiber cable in a direction parallel to the rotation axis AR of the concave reflecting mirror 6 toward the focal point F. The light emitted on the optical axis OA parallel to the rotation axis AR of the concave reflecting mirror 6 is reflected by the concave reflecting mirror 6 and reaches the focal point F based on the nature of the rotating paraboloid. Since the light emitted from the emitting end OE of the optical fiber cable spreads with a divergence angle θ, the light spreading around the optical axis OA is reflected by the concave reflecting mirror 6 and reaches the vicinity of the focal point F.

The emitting end OE of the optical fiber cable is separated from the rotation axis AR of the concave reflecting mirror 6 by a predetermined separation distance, and is shifted in the axial direction of the rotation axis AR by a shift distance corresponding to the separation distance from the plane including the light receiving surface 2a. As a result, the emitting end OE can be mounted so that the reachable range falls within the light receiving surface 2a according to the separation distance, and all the light incident through the optical fiber cable is incident on the light receiving element 2, and thus the output of the power supply converters 1, 1A and 1B can be increased.

The shift distance is set based on the divergence angle and the separation distance of the light emitted from the emitting end OE of the optical fiber cable so that all the light emitted from the emitting end OE is incident on the light receiving surface 2a. As a result, even if there are optical fiber cables having different divergence angles, the position of the emitting end OE can be set according to the attached optical fiber cable. Therefore, all of the emitted light can be incident on the light receiving surface 2a to increase the output of the optical power supply converters 1, 1A.

The mounting portions 9, 19a and 19b are formed so that the emitting ends OE of a plurality of optical fiber cables can be mounted in an arc shape centered on the rotation axis AR. Since the separation distances of the emitting ends OE of the plurality of optical fiber cables can be made uniform, the shift distances can be made uniform according to the separation distances. Therefore, it becomes easy to mount the plurality of emitting ends OE on the corresponding mounting portions 9, 19a, 19b. Then, all of the light emitted from the emitting ends OE can be incident on the light receiving surface 2a to increase the output of the optical power supply converters 1 and 1A.

The mounting portion 29 is formed so that the emitting end OER of the ribbon fiber cable formed by arranging a plurality of optical fiber cables in a row can be mounted in an arc shape centered on the rotation axis AR. By aligning the separation distances of the plurality of emitting ends of the ribbon fiber cable, the shift distances can be aligned and the ribbon fiber cables can be mounted integrally. Therefore, it becomes easy to mount the emitting ends OER on the mounting portions 29. Then, all the light emitted from the emitting ends OER can be incident on the light receiving surface 2a to increase the output of the optical power supply converter 1B. Further, since the distance between the optical fiber cables constituting the ribbon fiber cable can be minimized and the number of optical fiber cables that can be attached can be increased, the optical input is increased to increase the output of the optical power supply converter 1B.

In addition, a person skilled in the art can carry out the embodiment in a form in which various modifications are added to the above embodiments without departing from the present invention, and the present invention also includes such modified forms.

DESCRIPTION OF REFERENCE NUMERALS 1, 1A, 1B: optical power supply converter, 2: light receiving element 2a: light receiving surface, 3: reflective part, 4, 14, 24: base, 5a, 5b): lead frame, 6: concave reflecting mirror, 7: side wall, 8: cutout, 9, 19a, 19b, 29: mounting portion, 10: guide portion, insertion portion, 10b: restraining portion, AR: rotation axis, F: focus, OA: optical axis, OE, OER: emitting end, h, h1, h2: shift distance, s, s1, s2: separation distance, θ: divergence angle

The invention claimed is:

1. An optical power supply converter that photoelectrically converts light incident through a plurality of optical fiber cables and supplies a power to outside, comprising;
  a reflecting part including a concave reflecting mirror whose reflective surface is a concave surface made of a rotating paraboloid,
  a light receiving element for photoelectric conversion having a light receiving surface orthogonal to a rotation axis of the concave reflecting mirror and arranged so that a center of the light receiving surface coincides with a focal point of the concave reflecting mirror, and
  a plurality of mounting portions for mounting emitting ends of the optical fiber cables in parallel with the rotation axis with separating the emitting ends of the optical fiber cables by one or more predetermined separation distances from the rotation axis so as to emit light toward the concave reflecting mirror, the plurality of mounting portions being capable of mounting the emitting ends at positions closer to or away from the concave reflecting mirror by one or more shift distances corresponding to the separation distance in an axial direction of the rotation axis from a plane including the light receiving surface.

2. The optical power supply converter according to claim 1; wherein the shift distance is set based on a divergence angle of the light emitted from the emitting end of the optical fiber cable and the separation distance so that all the light emitted from the emitting ends are incident on the light receiving surface.

3. The optical power supply converter according to claim 1 or 2; wherein the plurality of mounting portions are formed so that the emitting ends of the plurality of optical fiber cables can be mounted in an arc shape centered on the rotation axis.

4. The optical power supply converter according to claim 1; wherein the mounting portions are formed so that the emitting ends of a ribbon fiber cable formed by arranging a plurality of the optical fiber cables in parallel in a row can be mounted.

* * * * *